United States Patent [19]

Hurley, III et al.

[11] 4,182,953

[45] Jan. 8, 1980

[54] ROTATING SHAFT PULSE GENERATING APPARATUS

[75] Inventors: George L. Hurley, III, Alpine; Michael S. Krystek, Spring Valley, both of Calif.

[73] Assignee: General Atomic Company, San Diego, Calif.

[21] Appl. No.: 870,115

[22] Filed: Jan. 17, 1978

[51] Int. Cl.² .............................................. G01D 5/34
[52] U.S. Cl. ............................................. 250/231 SE
[58] Field of Search ........ 250/231 R, 231 SE, 237 G, 250/209, 214 R; 324/175; 340/347 P

[56] References Cited

U.S. PATENT DOCUMENTS

| 3,693,024 | 9/1972 | Hulle et al. | 340/347 P |
| 3,824,878 | 7/1974 | Grosseau | 250/231 SE |
| 4,093,853 | 6/1978 | Hunt | 324/175 |

*Primary Examiner*—David C. Nelms
*Attorney, Agent, or Firm*—Fitch, Even & Tabin

[57] ABSTRACT

Apparatus is disclosed for generating electrical pulses in response to rotation of a shaft. The apparatus incorporates an internal optical disc carried by a hub assembly attached to the operating shaft, with the hub assembly having a beveled bearing surface at one end thereof for engaging a similarly beveled surface of the apparatus housing, and biasing means for biasing the hub assembly toward said housing beveled surface to compensate for mechanical wear and to also minimize erratic movement of the optical disc. The combination of a light emitting diode and photo-transistor generate electrical signals in response to the blocking and transmitting of light through radially oriented opaque segments of the disc during rotation. The light emitting diodes and photo-transistors are retained by receptacles which snap fit within cooperating apertures of the housing. A second combination of a light emitting diode and photo-transistor, together with a second stationary disc provide two phase shifted signals which can reduce problems caused by jitter, backlash and the like.

30 Claims, 5 Drawing Figures

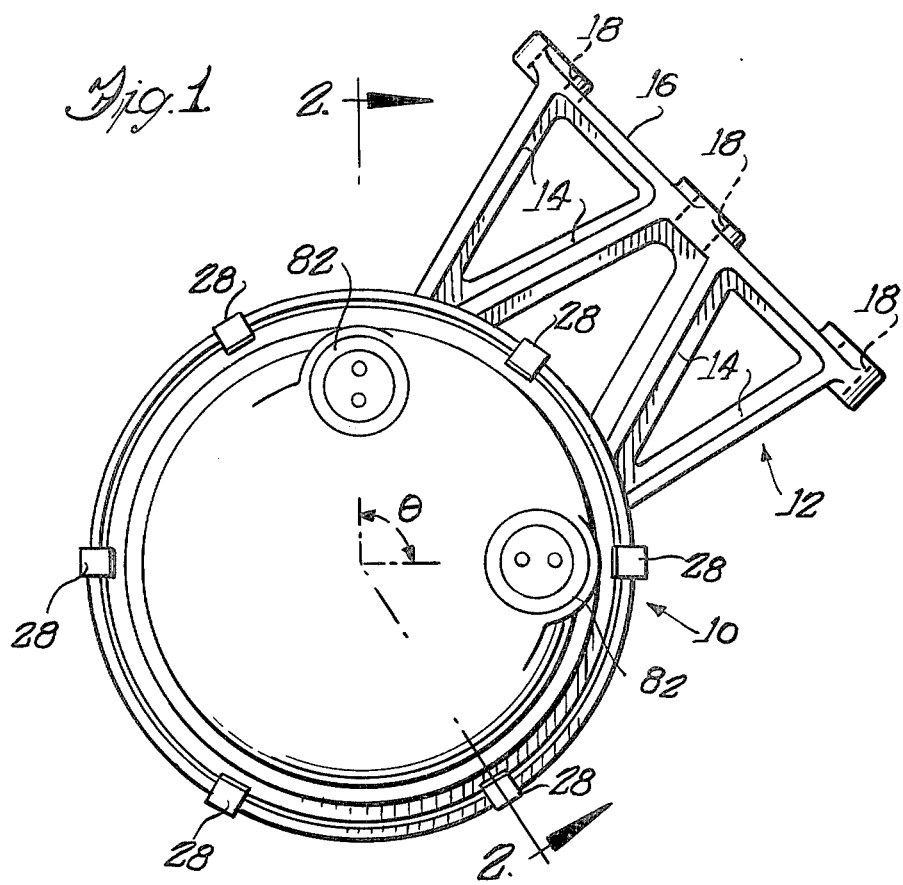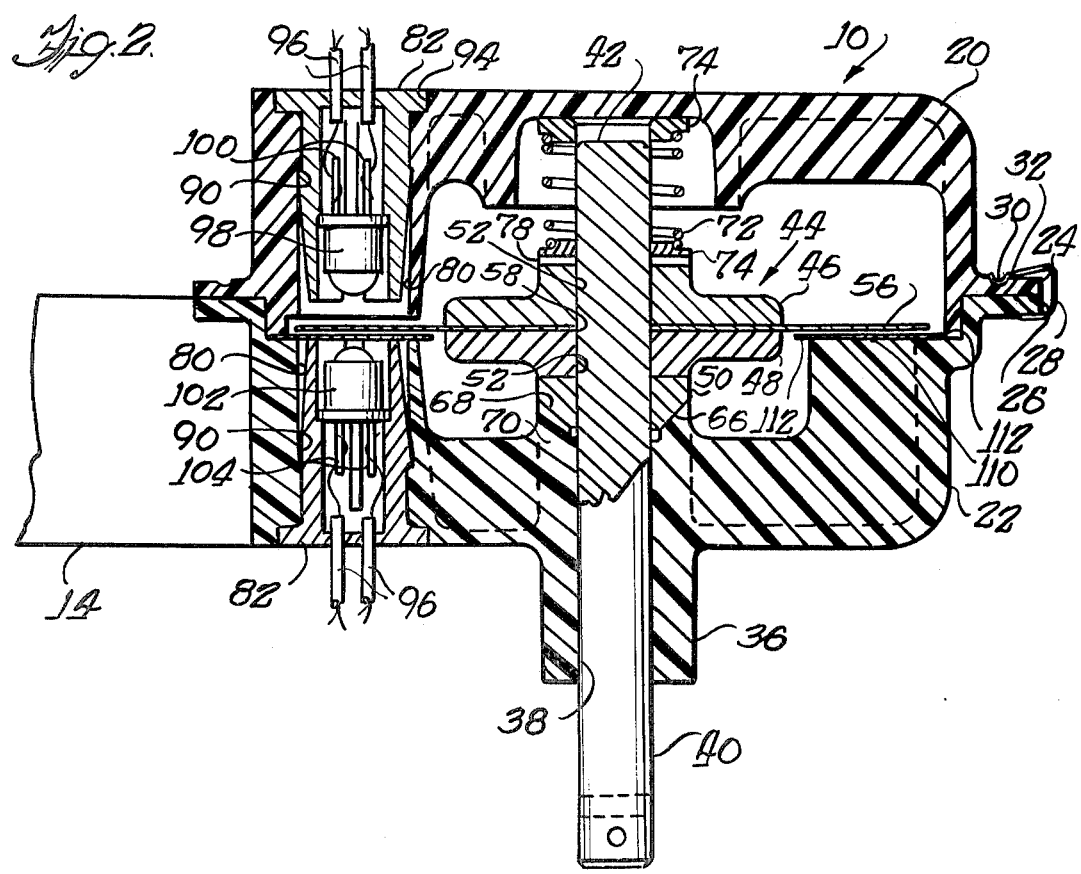

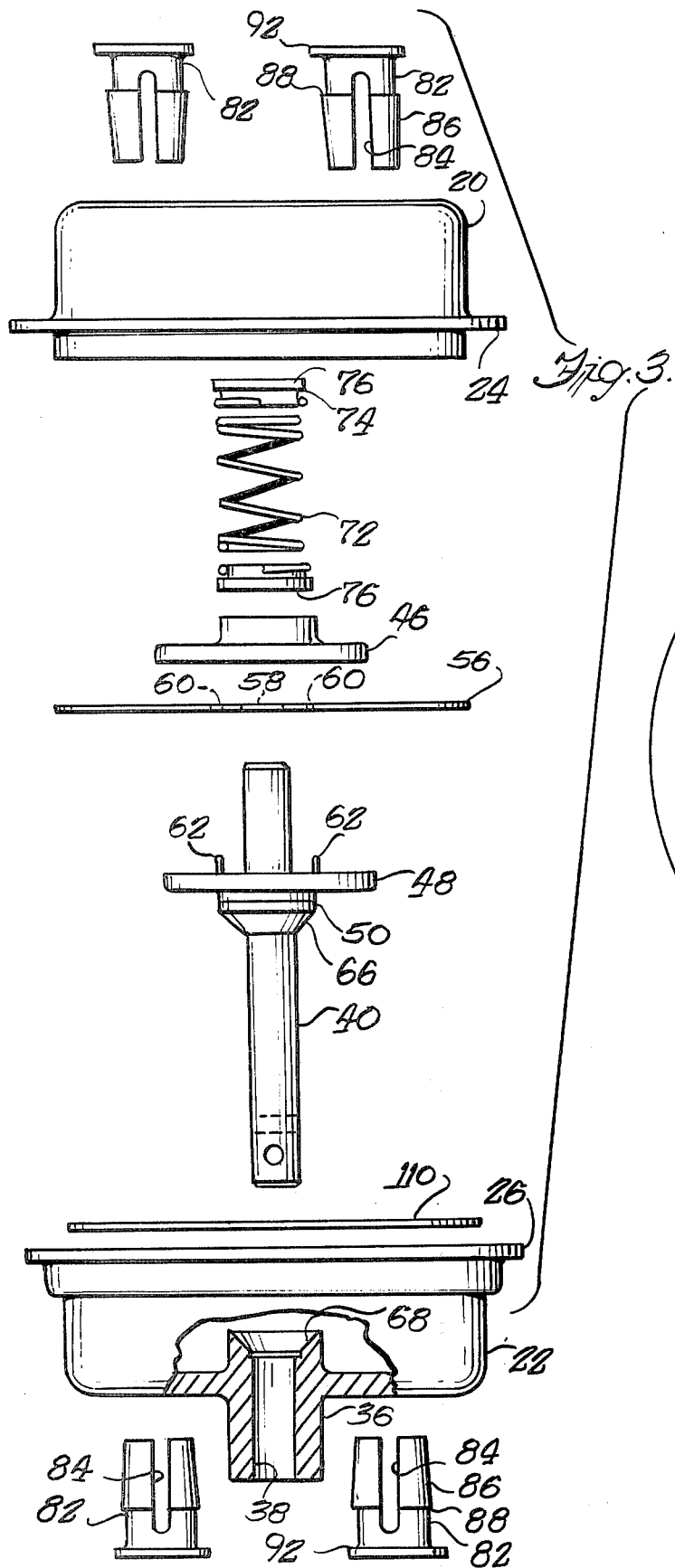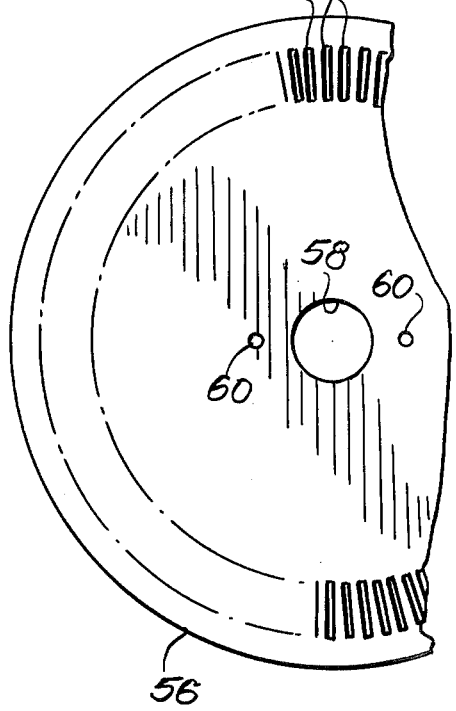

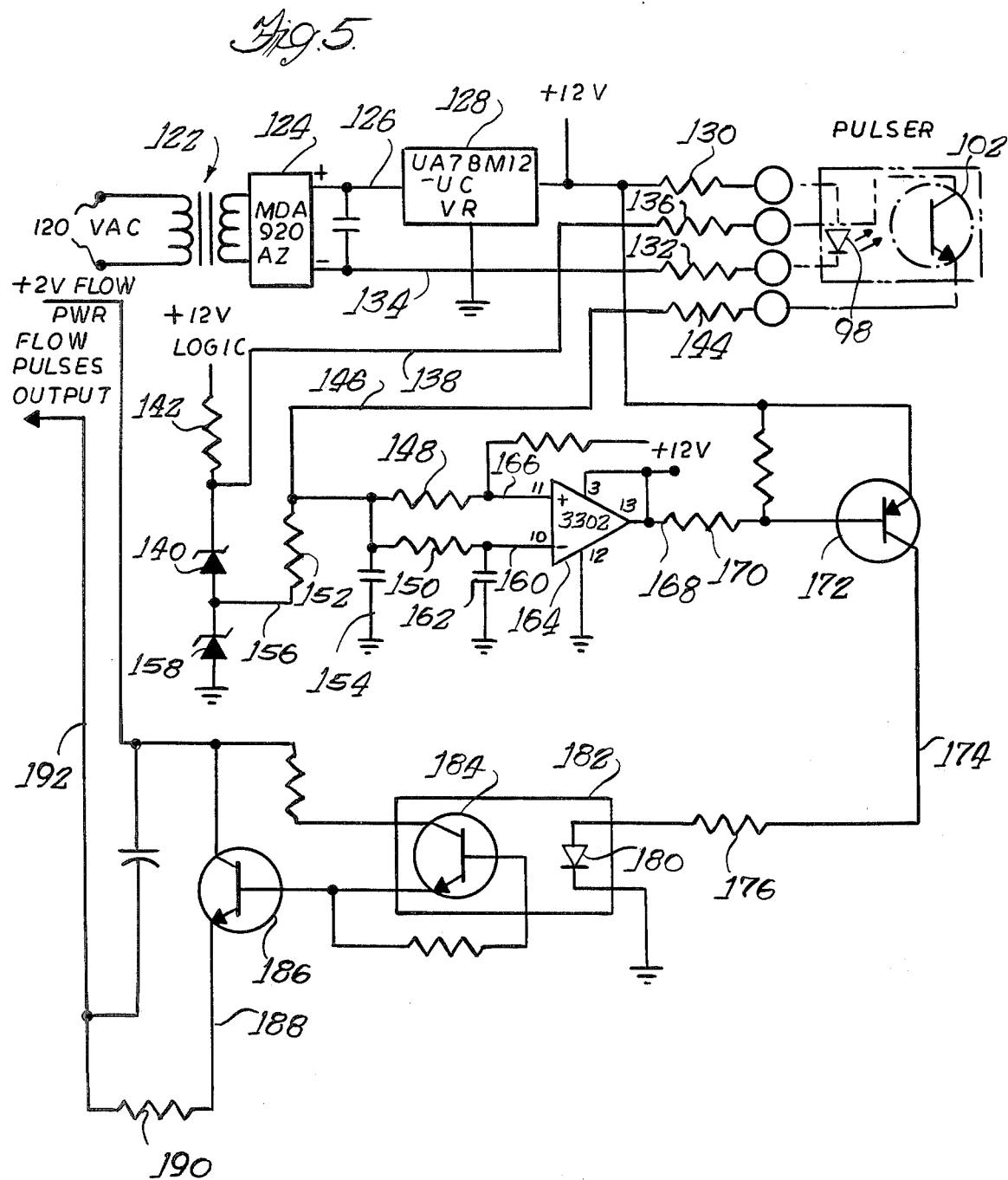

ROTATING SHAFT PULSE GENERATING APPARATUS

The present invention is generally related to apparatus for producing electrical pulses in response to rotation of a shaft.

While many devices have been developed which generate electrical pulses or signals in response to the rotation of a shaft, there has continued to be a need for a device which will accomplish this task in a reliable manner and at a reasonable cost. One significant application for such a pulse generating device is in the area of gasoline or service stations where each pump in the station may desirably have one or more pulse generating devices for producing electrical signals that can be transmitted to a central console in the station building or the like. This is particularly evident with the proliferation of self-service gas stations which are becoming increasingly sophisticated. In many of the systems that are being used in such stations, the operator of the station can be located in the station building and use sophisticated electronic apparatus for controlling the operation of a large number of pumps and thereby substantially decrease the labor costs associated with dispensing gasoline. With such systems, there is a necessity to transmit electrical information to the operator console relating to the volume of gasoline that is being dispensed at each pump location. This in turn necessitates a device for generating the electrical signals in response to the flow of the gasoline through the metering devices at the pump and it can easily be appreciated that even one service station may require a large number of such devices. Thus, with the continued proliferation of such sophisticated systems throughout the country and indeed the world, the need for a device that is reliable, accurate, inexpensive and safe is clearly evident. It should also be appreciated that such a device should be designed so that it can be easily installed at a gasoline pump without any requirement for individual adjustment subsequent to its initial installation and it is desirable that the device have an extended longevity and not ultimately produce inaccuracy due to wear between moving surfaces after extended use.

Accordingly, it is a primary object of the present invention to provide an apparatus for generating electrical signals in response to the rotation of a shaft, wherein the apparatus is of superior design in that it is safe, inexpensive, highly reliable and compact, and is highly accurate throughout its extended useful life.

Another object of the present invention is to provide an apparatus of the above type which produces electrical signals in response to mechanical rotation in a reliable manner, even in the presence of significant mechanical vibration.

Yet another object of the present invention is to provide apparatus of the above type which requires virtually no adjustments subsequent to fabrication and yet is highly reliable and accurate.

Still another object of the present invention lies in the provision for compensating for wear and in the prevention of erratic movement of the internal rotating components during operation.

Other objects and advantages will become apparent upon reading the following detailed description, while referring to the attached drawings, in which:

FIG. 1 is a top plan view of apparatus embodying the present invention;

FIG. 2 is a cross-section of the apparatus shown in FIG. 1 and is taken generally along the line 2—2 thereof;

FIG. 3 is an exploded side elevation of the apparatus shown in FIG. 2 and is shown with portions broken away;

FIG. 4 is a plan view of the rotating disc portion of the apparatus of the present invention, shown with portions broken away;

FIG. 5 is an electrical schematic diagram of electrical circuitry that can be used with the apparatus shown in FIGS. 1-4 for shaping the electrical pulses produced during operation of the apparatus of FIGS. 1-4.

Turning now to the drawings and particularly FIG. 1, the apparatus of the present invention is shown to have a generally cylindrically shaped housing 10, together with a preferably integrally formed mounting structure 12 for attaching the housing 10 to a surface (not shown) and comprises lateral support members 14 and a generally transverse support section 16 which has a number of apertures 18 through which suitable attachment means, such as bolts, screws or the like can be used to attach the apparatus to a mounting surface, such as a mechanical computer of a gasoline pump, for example. It should be understood that the mounting structure 12 may take on various configurations depending upon the particular application for which the apparatus is intended, and different attachment means can be utilized.

As is best shown in FIGS. 2 and 3, the housing 10 comprises an upper section 20 and a lower section 22 which mate together to define the complete housing of the apparatus. The upper section 20 has a peripheral flange 24 that abuts a similar flange 26 of the lower section 22, with the outwardly extending flanges 24 and 26 extending circumferentially around the housing as shown in FIG. 1. To hold the sections together, a number of resilient and preferably metallic compression clips 28 are provided, with the clips having an end portion 30 that fits within a groove 32 in the upper flange 24 and retains the same. The lower section 22 has a cylindrical extension 36 protruding from the bottom thereof and has a circular opening 38 for receiving a shaft 40 therein which extends beyond the lower end of the extension 36 and is thereby adapted to be connected to an external member or shaft, such as a metering device associated with a gasoline pump, for example. The shaft 40 extends through the opening 38 into the interior of the housing 10 and its upper end 42 is shown to terminate short of the inside surface of the upper portion 20. A hub assembly, indicated generally at 44, is attached to the shaft 40 so that it will rotate with the shaft.

The hub assembly includes upper and lower portions 46 and 48, with the lower portion 48 having an extension 50 that may be fabricated from the same material as the lower portion 48 or from a different material as will be hereinafter described. The sections 46, 48, 50 all have circular openings 52 through which the shaft 40 is inserted. While it is preferred that the shaft tightly fit within the openings 52 in close frictional engagement so that the hub assembly rotates with the shaft, it should be appreciated that set screws or the like may be used to insure that slippage does not occur. Between the upper and lower portions 46 and 48 of the hub assembly, is a disc 56 which rotates with the hub assembly, the disc 56 being of a flat circular shape and preferably fabricated from Mylar or other dimensionally stable material that is sufficiently transparent to permit a light circuit to be made through it.

The disc 56 may have a thickness within the range of about 5 to about 10 thousandths of an inch, although the thickness is not particularly critical so long as the transparent qualities are not impaired due to increased thickness of the material. Also, the material should be sufficiently thick to maintain its flat shape and not bend within the temperature fluctuations that it may experience in various climates. The aperture 58 is preferably only slightly larger than the outer diameter of the shaft 40 so that it is relatively tight fitting for the purpose of maintaining concentrical alignment with the shaft for reasons that will be hereinafter described.

The disc 56 also has an opening 58 in the center thereof through which the shaft may pass and also has a pair of smaller apertures 60 (see FIG. 4) which receive respective pegs 62 which are preferably integrally formed with the lower hub portion 48. The pegs 62 also preferably fit within cooperating apertures of the upper hub portion 46 and thereby lock the disc between the two hub portions with the pegs assuring rotation of the disc with the hub assembly. Since the pegs 62 of the lower hub portion 48 fit within the apertures 60 of the disc and insure its rotation during rotation of the hub assembly 44, the aperture 58 need not be of such close fit so as to insure rotation, as was the case for the apertures 52 in the other components of the hub assembly 44.

The lower extension 50 of the hub assembly is shown to have a beveled bearing surface 66 which contacts a similarly angled bearing surface 68 located in an upward interior extension 70 of the lower housing section 22. The surfaces 66 and 68 are in contact with one another and also move relative to one another during rotation of the shaft and hub assembly 44. The angle of the bearing surfaces are preferably about 45° relative to the axis of the shaft 40, as shown in FIGS. 2 and 3.

A compression spring 72 is positioned above the hub assembly 44 with its lower end bearing against the hub assembly and its upper end bearing against the interior of the upper housing section 20. This provides a net downward force on the hub assembly which biases the hub assembly so that the beveled surfaces 66 and 68 are in intimate contact with one another during rotation of the shaft and hub assembly 44. End caps 74 located on each end of the spring 72 preferably are attached to the spring and have a generally flat surface 76 for contacting the respective adjacent surfaces of the housing and hub assembly. This minimizes any wear that may be caused from the end of the spring rubbing on the surface of the hub assembly as well as the surface of the housing section 20 by distributing the force over the entire area of the end surfaces 76, rather than the relatively localized area of the ends of the spring itself. A flat brass washer 78 may be provided between the lower end cap 74 and the end surface of the upper component 46 to reduce friction in the event the lower end cap and the component 46 are fabricated from the same material. It is generally recognized that with many materials, two contacting surfaces which move relative to one another will experience greater friction when they are made from similar materials than if they are made from dissimilar materials. For this reason, the lower extension 50 of the hub assembly 44 may preferably be fabricated from brass or some other material that is dissimilar to the material from which the lower housing section 22 is fabricated. In this regard, the components 46 and 48 of the hub assembly, as well as the housing sections 20 and 22 are preferably made of Delrin plastic made by the DuPont Company of Wilmington, Del. although other plastic materials can be used. The Delrin material is desirable for the reason that it is self-lubricating and has a relatively low shrink rate during forming and use and also experiences good wear characteristics.

The shaft 40 may be connected to the metering device in a gasoline pump or the like which may produce a rotational velocity of up to 150 rpm. The shaft may also experience relatively significant vibration in this environment due to the operation of the pump motor. The construction of the apparatus of the present invention is effective to substantially reduce vibration of the hub assembly and accompanying disc 56 and thereby minimize the possibility of producing erroneous pulses during rotation of the disc. This is achieved by the beveled surfaces 66 and 68, with the spring 72 biasing the hub assembly so that the beveled surfaces are brought into close contact with one another. As the apparatus advances through its useful life, normal wear on the surfaces 66 and 68 will be compensated for by the spring continuing to bias the hub assembly downwardly to maintain the beveled surfaces in contact with one another and the angle of the bevel provides a vertical as well as horizontal component of force which tends to prevent any undesirable horizontal and vertical movement of the hub assembly which could affect the accurate generation of pulses. Stated in other words, the mechanical loading caused by the spring 72 effectively compensates for mechanical wear by taking up the slack that is produced by wearing of the beveled surfaces and the loading also prevents erratic movement of the optical disc 56.

In accordance with another aspect of the present invention, the housing sections 20 and 22 have circular openings 80 therein for receiving generally cylindrically shaped receptacles, indicated at 82, which fit within the openings 80 and contain electrical components which cooperate to detect rotational movement of the shaft and generate electrical signals indicative of such rotational movement. The receptacles 82 are preferably fabricated of plastic or plasticlike materials and have resilient sidewalls with axial slots 84 therein at four orthogonal locations, which thereby define four side portions that flex and facilitate snap-in locking retention when the receptacle is inserted into one of the openings 80. To provide the locking retention, the receptacle sidewall has a slightly angled outer surface 86 that terminates in a small annular ledge 88 that cooperates with a similarly configured opposing ledge 90 (see FIG. 2) when the receptacle is inserted into the opening 80. The outer end of the receptacle 82 has a larger flange 92 which fits in a cooperating enlarged recess portion 94 of the opening 80 to limit the insertion of the receptacle so that the end of the receptacle 82 is generally flush with the surface of the housing after insertion. The outer end of the receptacle 82 also has a pair of openings through which electrical conductors 96 pass for connection to external circuitry. The receptacles 82 retain electrical components such as light generating means or means for generating electrical signals in response to the presence and absence of light.

More specifically, and referring to FIG. 2, the upper receptacle can contain a light emitting diode 98 which is retained in the receptacle 82 and which has leads 100 for connection to the conductors 96. The lower receptacle can contain a photo-transistor 102 which is also connected to the external conductors 96 via leads 104 as shown. By incorporating the electrical components within the receptacles, they can be easily inserted into the apparatus and can also permit easy removal and replacement in the event of a malfunction of one of the components. The light emitting diode 98 and photo-transistor 102 are aligned with one another so that the photo-transistor 102 can be switched into conduction when it detects light from the light emitting diode 98 and will be switched off when it does not detect the presence of light. As will be described herein, the disc 56 is provided with alternate radially aligned opaque and transparent segments which block and transmit the light from the LED 98 and the photo-transistor 102 detects the presence and absence of light during rotation of the disc.

As is shown in FIG. 1, there are preferably two means for producing the electrical signals, i.e., two combinations of LEDs and photo-transistors such as have been described with respect to FIG. 2, with each combination being located 90° apart from the other relative to the center of the shaft. The angle θ shown in FIG. 1 therefore is preferably 90° and the apparatus can thereby conveniently use the two sets of electrical signals to determine the proper direction of rotation and effectively remove undesirable effects such as jittering and backlash, i.e., the slight movement in the opposite direction that can occur after the shaft stops, for example. The device preferably includes a second stationary disc 110 which is positioned beneath the rotating disc 56 and which rests on the lower housing section 22, it also being firmly held in place by the impingement of the inner end 112 of the upper section 20. The stationary disc 110 has an appreciably larger opening 112 therein so as to not interfere with the rotation of the hub assembly 44. Turning now to FIG. 4 which illustrates the rotating disc 56, it is shown to have a plurality of radially oriented opaque segments 116 which are evenly spaced around the outer periphery of the disc as shown. The areas between the segments 116 comprise transparent segments having the same size as the opaque segments. The opaque and transparent segments thereby define an annular track of alternating light blocking and light transmitting segments and the track is located in the light path between the LED 98 and photo-transistor 102 as shown in FIG. 2.

The number of light blocking or opaque segments in the track is preferably chosen to provide the desired resolution and may be on the order of about 100 for a disc having an overall diameter of about 2¼ to about 2½ inches or may be as great as 250 segments, for example. The number of pulses produced by the photo-transistor per revolution of the shaft will correspond to the number of opaque segments that are present on the disc. The lower disc 110 also contains the opaque and transparent segments and it is preferred that there be one additional or one fewer opaque segments in the stationary disc than in the rotating disc for the purpose of providing a 90° phase shift between the electrical signals produced by the two photo-transistors. Although it should be appreciated that the stationary disc need not have the segments extending completely around the entire circumference of the track since it is stationary and will only provide any useful function with respect to the operation of the apparatus at those areas where the electrical components are located, the use of a disc having the segments located completely around the track facilitates easy assembly of the apparatus and removes any possibility of incorrect angular positioning of the stationary disc when it is inserted within the apparatus during assembly.

With the combination of the 90° mechanical phase shift that is provided by the positioning of the two combinations of electrical components 90° relative one another, coupled with the use of the two discs wherein one has a one greater or lesser number of opaque segments than the other which creates an electrical phase shift, the photo-transistor of one combination of components will become true before the other and will thereby provide two signals which can be processed to define the proper direction of rotation. It should of course be understood that the output of the photo-transistor 102 will provide an electrical pulse each time the transparent segments of the rotating disc come into registration with the transparent segments of the stationary disc. However the shape of the pulse will generally resemble a sine wave as the photo-transistor varies from an off condition when no light is passed to a peak value when the transparent segments of the discs are in substantial registration.

While the generally sine wave shaped output from the photo-transistor 102 may be an adequately shaped electrical signal for many applications, it may be desirable to provide well defined square shaped pulses for use in other systems, and circuitry for providing such a square wave output is shown in FIG. 5 and will now be described.

The alternating current line voltage is applied on lines 120 and are connected to the primary side of a transformer 122, the secondary of which is connected to a DC rectifier 124, the output of which appears on line 126 which is connected to a voltage regulator 128. The output of the regulator 128 is connected through a resistor 130 to the light emitting diode 98, the cathode of which is connected via resistor 132 and line 134 to the negative side of the rectifier 124. The photo-transistor 102 has its collector connected through resistor 136 and line 138 to a Zener diode 140 and to a resistor 142 which is in turn connected to a source of positive voltage. The emitter of the photo-transistor 102 is connected through resistor 144 to line 146 which is connected to resistors 148, 150, 152 and a capacitor 154, with the resistor 152 being connected via line 156 to the Zener diode 140 and to a second Zener diode 158. The resistor 150 is connected via line 160 to a capacitor 162 as well as to one input of a comparator 164, the other input of which is supplied by line 166 which is connected to the resistor 148.

Since the sensitivity of photo-transistors 102 may vary from device to device, the maximum and minimum signal levels may be quite different in different ones of the circuits shown in FIG. 5. While the variation in output levels may be corrected by incorporating an adjustment potentiometer in the output circuit of the photo-transistor, this would require individual adjustment of each circuit which would be time consuming and expensive. To avoid this problem, the circuitry shown in FIG. 5 effectively determines the average value of the photo-transistor output and uses the average value as one input to the comparator and produces a square wave output as is desired. More specifically, the Zener diodes 140 and 158 establish voltages across the photo-transistor 102, with the cathode of the Zener diode 140 preferably being about 8 volts and the anode thereof (and necessarily the cathode of Zener diode 158) at a level of about 4 volts. Thus, the output of the photo-transistor 102 will vary between these two limits.

It may vary between voltage levels of 4 to about 4¼ or may vary between 8 and 7½ volts, for example, or between some intermediate values. The voltage level on line 146 is applied to an integrator defined by the resistor 150 and capacitor 162 which provide an average value of the input signal on line 146 that is applied via the line 160 to one input of the comparator 164. The other input line 166 contains the instantaneous value of the voltage on line 146 so that the comparator provides a high level on output line 168 when input line 166 exceeds the average value on line 160 and a low output level on line 168 when the level on line 166 is below the level on input line 160. The comparator thereby provides a square wave output on line 168. The line 168 is connected via resistor 170 to the base of a transistor 172, the collector of which is connected via line 174 to resistor 176 which is in turn connected to a light emitting diode portion 180 of an opto-isolator 182. The phototransistor portion 184 is connected to and switches transistor 186 on and off and produces output pulses on line 188 which is connected to resistor 190 which in turn is connected to line 192.

From the foregoing detailed description, it should be apparent that a pulse generating apparatus responsive to rotation of a shaft has been shown and described which is of superior design, in that it is compact, easy to assemble, inexpensive and highly reliable and accurate in its operation. The apparatus compensates for wear between moving surfaces and also reduces erratic movement of the moving parts which could affect the accuracy of the apparatus.

Many of the specific circuits described with respect to FIG. 5 are well known and of conventional design and for that reason a detailed explanation of the circuits is not included herein. Moreover, several integrated circuits are illustrated in block form rather than illustrating the detailed circuitry that is contained within them and in those cases, the standard industry designation numbers are shown within the blocks, together with the pin numbers of certain of the integrated circuits. The detailed circuits for these block diagrammatic representations are incorporated by reference herein.

It is understood that although preferred embodiments of the present invention have been illustrated and described, various modifications, alternatives and variations thereof will become apparent to those skilled in the art and, accordingly, the scope of the present invention should be defined only by the appended claims and equivalents thereof.

Various features of the invention are set forth in the following claims.

What is claimed is:

1. Apparatus for generating electrical signals in response to the rotation of a shaft, comprising:
    a housing having first and second sections, said sections mating with one another, one of said sections having a circular opening therein for receiving an elongated rotatable shaft;
    an elongated rotatable shaft located in said opening and extending outwardly of said housing, said shaft being adapted for attachment to an external shaft or the like;
    a hub assembly attached to said shaft and located within said housing, said assembly being rotatable with said shaft and carrying a generally flat circular disc member having a plurality of spaced apart radially oriented opaque segments positioned around the outer periphery thereof, the areas between adjacent opaque segments defining light transmitting segments, said hub assembly having an end bearing surface in contact with an internal bearing surface on one of said housing sections;
    at least one light producing means located on one side of said disc within said housing;
    at least one means for generating electrical signals in response to the detection of the presence and absence of light, said generating means being located on the side of said disc opposite said light producing means;
    means for biasing said shaft and attached hub assembly toward said housing section internal surface;
    said contacting bearing surfaces of said hub assembly and said housing section defining an annulus around said shaft that is oriented at a predetermined angle relative to the axis of said shaft.

2. Apparatus as defined in claim 1 wherein said hub assembly comprises two mating portions, each of which has a centrally located aperture in which said shaft is located, said disc being located between said two mating portions, one of said mating portions having said end bearing surface for contacting said internal bearing surface of said housing section.

3. Apparatus as defined in claim 2 wherein said mating portions of said hub assembly and said housing sections are fabricated from a moldable material, the end portion having said contacting end bearing surface of said one mating portion of said hub assembly being fabricated of a dissimilar material for the purpose of reducing sliding friction between said contacting surfaces.

4. Apparatus as defined in claim 1 wherein said means for biasing said shaft and attached hub assembly comprises a spring means, one end of which bears against said hub assembly, the other end of which bears against an interior surface of one of said housing sections.

5. Apparatus as defined in claim 4 further including end cap means attached to said spring means for isolating the end of said spring means from said surface of said housing to minimize friction and wear that can occur during rotation of said hub assembly.

6. Apparatus as defined in claim 4 further including end cap means attached to said spring means for isolating the end of said spring means from the hub assembly to minimize friction and wear that can occur during rotation of said hub assembly.

7. Apparatus as defined in claim 5 further including a flat annular means interposed between said end cap and said hub assembly, said flat plate means being fabricated of a material other than said material from which said end cap is fabricated for reducing friction therebetween.

8. Apparatus as defined in claim 1 wherein each of said housing sections has an outwardly extending flange, with the flanges being adjacent one another, said apparatus further including at least more resilient fastening means operatively associated with said flanges for holding said housing sections together.

9. Apparatus as defined in claim 1 wherein each of said housing sections includes at least one additional aperture for receiving a receptacle means in fitting engagement, said receptacle means having a resilient outer configuration for snap fitting into said aperture, said receptacle means being adapted to retain one of said light producing means or said electrical signal generating means therein.

10. Apparatus as defined in claim 9 wherein said apertures are generally aligned with one another so that a receptacle means retaining a light producing means is located in one housing section and a receptacle means retaining an electrical signal generating means is in the aligned aperture of said other housing section, and said electrical signal generating means is adapted to produce said signals during rotation of said disc when said opaque segments and light transmitting segments alternating interrupt and pass light, respectively.

11. Apparatus as defined in claim 1 further including a stationary second disc located within said housing and having a plurality of spaced apart radially oriented opaque segments and intermediate light passing segments, the difference between the number of opaque segments of said first relative to second disc equaling one, so as to provide a phase shift with respect to the passing of light through said transmitting portions at various angular locations around said disc.

12. Apparatus as defined in claim 1 further including two light producing means and two of said electrical signal generating means, each of said signal generating means being positioned 90° from one another relative to said shaft, each of said electrical signal generating means being positioned opposite one of said light producing means.

13. Apparatus as defined in claim 1 wherein said light producing means comprises a light emitting diode.

14. Apparatus as defined in claim 1 wherein each of said electrical signal generating means comprises a light responsive semi-conductor device.

15. Apparatus as defined in claim 1 wherein said disc is fabricated from light transparent material and said plurality of opaque segments are applied to the surface of said disc.

16. Apparatus for generating electrical signals in response to the rotation of a shaft, comprising:
a housing having two mating sections, one of said sections having a generally centrally located circular opening for retaining an elongated rotatable shaft, said section having a beveled interior annular surface adjacent said opening;
an elongated rotatable shaft located within said circular opening and extending outwardly from said housing and adapted for connection to an external driving member;
a hub assembly secured to said shaft and located inside said housing, one end of said hub assembly having a beveled annular bearing surface adapted for contact with the beveled annular bearing surface of said housing section, the bevel angle of said bearing surfaces being substantially similar to one another, said hub assembly carrying a disc that rotates during rotation of said hub assembly and said shaft, the outer portion of said disc having a plurality of radially extending light blocking segments separated by substantially similarly sized light transmitting segments;
means for biasing said hub assembly and shaft so that said hub assembly beveled annular surface is biased toward said beveled annular surface of said housing, the angle of said bevel creating resulting forces toward the center of said shaft and toward said housing beveled surface to minimize vibration and erratic movement of said hub assembly and said disc and to compensate for wear that occurs between said annular surfaces during rotation of said shaft and hub assembly;
at least one combination of a means for producing light and a means for generating electrical signals in response to the presence and absence of light, the rotation of said disc causing said opaque and light transmitting segments to alternately block and pass light through said disc and thereby produce said electrical signals.

17. Apparatus as defined in claim 16 wherein said means for producing light is located on one side of said disc and said means for generating electrical signals in response to the detection of the presence and absence of light is located on the side of said disc opposite said light producing means.

18. Apparatus as defined in claim 16 including two of said combinations, each combination being physically located 90° apart from the other relative to said shaft.

19. Apparatus as defined in claim 17 wherein said housing sections include apertures therein for receiving receptacle means in fitting engagement, said retaining means being adapted to retain one of said light producing means or one of said electrical signal generating means.

20. Apparatus as defined in claim 16 wherein said hub assembly comprises two mating portions, each of which has a centrally located aperture in which said shaft is located, said disc being located between said two mating portions, one of said mating portions having said end bearing surface for contacting said internal bearing surface of said housing section.

21. Apparatus as defined in claim 20 wherein said mating portions of said hub assembly and said housing sections are fabricated from a moldable material, the end portion having said contacting end bearing surface of said one mating portion of said hub assembly being fabricated of a dissimilar material for the purpose of reducing sliding friction between said contacting surfaces.

22. Apparatus as defined in claim 16 wherein said means for biasing said shaft and attached hub assembly comprises a compression spring means, one end of which bears against said hub assembly, the other end of which bears against an interior surface of one of said housing sections.

23. Apparatus as defined in claim 22 further including end cap means attached to said spring means for isolating the end of said spring means from said surface of said housing to minimize friction and wear that can occur during rotation of said hub assembly.

24. Apparatus as defined in claim 22 further including end cap means attached to said compression spring means for isolating the end of said spring means from the hub assembly to minimize friction and wear that can occur during rotation of said hub assembly.

25. Apparatus as defined in claim 16 wherein said light producing means comprises a light emitting diode.

26. Apparatus as defined in claim 16 wherein each of said electrical signal generating means comprises a light responsive semi-conductor device.

27. Apparatus as defined in claim 16 wherein said disc is fabricated from light transparent material and said plurality of opaque segments are applied to the surface of said disc.

28. Apparatus as defined in claim 16 further including circuit means for shaping said electrical signals into square shaped pulses, comprising:
comparator means having first and second inputs and an output and providing a high output when the voltage on said first input exceeds the voltage on the second input, and a low when the first input voltage is below said second input voltage, said first input being connected to said electrical signal producing means and thereby apply a varying voltage thereto;

integrating means connected to said electrical signal producing means for producing an output voltage level corresponding to the average value of said signals produced by said signal producing means, said integrator means being connected to apply said output voltage level to said second input of said comparator means.

29. Apparatus as defined in claim 28 further including means for limiting the voltage fluctuations of the signals produced by said signal producing means between predetermined upper and lower values.

30. Apparatus as defined in claim 29 wherein said signal producing means includes a light responsive photo-transistor, and said voltage limiting means comprises:
a first Zener diode having its cathode connected to the collector of the photo-transistor through a first resistor and its anode connected to the transistor emitter through a second resistor;
a second Zener diode having its cathode connected to said first diode anode and its anode connected to ground, said first and second Zener diodes limiting the voltage fluctuations of the collector emitter circuit between first and second values during conduction and nonconduction of said photo-transistor.

* * * * *